United States Patent [19]

Kinney

[11] 4,136,720
[45] Jan. 30, 1979

[54] PRODUCTION OF A MARBLED PRODUCT

[75] Inventor: Alfred W. Kinney, Kansas City, Mo.

[73] Assignee: Phillips Petroleum Company, Bartlesville, Okla.

[21] Appl. No.: 664,771

[22] Filed: Mar. 8, 1976

[51] Int. Cl.² .............................................. B65B 3/04
[52] U.S. Cl. ........................................ 141/9; 141/105; 366/337
[58] Field of Search .................... 137/604; 141/9, 99, 141/100, 105, 107, 250, 286, 392; 138/38, 42; 222/145; 259/4 R, 18, 36; 426/249; 366/337

[56] References Cited

U.S. PATENT DOCUMENTS

| | | | |
|---|---|---|---|
| 2,774,314 | 12/1956 | Moser | 426/249 |
| 3,129,673 | 4/1964 | Stanley et al. | 141/100 X |
| 3,388,894 | 6/1968 | Harrison | 259/4 R |
| 3,559,700 | 2/1971 | Erickson | 141/9 |
| 3,886,973 | 6/1975 | Kinney | 141/105 |

Primary Examiner—Richard E. Aegerter
Assistant Examiner—Frederick R. Schmidt

[57] ABSTRACT

Production of a marbled product is accomplished by associating a plurality of product constituent streamlets in a desired cross-sectional pattern or configuration, diverting a portion of one or more of the product constituent streamlets of the pattern into one or more of the other product constituent streamlets of the pattern, joining the associated streamlets into a unified marbled product stream, and then dispensing the marbled product stream into a product container.

26 Claims, 7 Drawing Figures

PRODUCTION OF A MARBLED PRODUCT

This invention relates to a method and apparatus for producing a marbled product. In another aspect the invention relates to a method and apparatus for filling a container with a marbled product. In still another aspect the invention relates to a method and apparatus for causing controlled disruption of a patterned product stream to create a marbled product stream. In yet another aspect the invention relates to a method and apparatus for producing a marbled ice cream product.

In producing a marbled product from a plurality of distinguishable product constituents or product streams it is desirable to provide the required degree of limited product constituent mixing. This limited mixing should take place in such a manner that the finished product will be characterized by the presence of groups of individually identifiable constituent material within the product and by the absence of loss of boundary definition between the various groups of individually identifiable constituent material in the product. Production methods and apparatus which provide too little product mixing to result in a uniformly marbled product or to insure uniformity of identifiable product proportions among individual finished product portions are to be avoided. Likewise, excess mixing or unnecessary turbulence with which mixing is accomplished are to be avoided since diminution of the esthetic appearance of the product caused by complete mixing of identifiable product constituents and loss of sharp definition between adjacent identifiable constituents will result. It is therefore desirable to provide a method and apparatus by which the mixing or marbling of the various identifiable constituents of a product can be accomplished so that the desired size and distribution of the individual product constituent contents can be achieved without sacrificing the sharpness and distinctness of the demarcation between individual identifiable constituents characteristic of those production techniques requiring a minimum of product mixing.

From a commercial standpoint, an additional problem in the production of a marbled product is the ability to provide a product which, due to its overall individual constituent distribution as well as its sharpness of definition between individual constituents, uniformity among individual packaged portion of the product, and other similar characteristics, can be easily identifiable as the product of a particular producer. In this regard, consistently providing a desirable marbling effect in each of the packaged product portions produced isz desirable.

It is therefore an object of the invention to provide a method and apparatus for producing a marbled product. Another object of the invention is to provide a method and apparatus for filling a container with a marbled product. Yet another object of the invention is to provide a method and apparatus for producing a marbled product having a distinctive marbled pattern. Another object of the invention is to provide a method and apparatus for producing a marbled ice cream product.

In accordance with the invention, various product constituent streamlets, one of each distinctive product constituent, are delivered to a patterning and marbling means wherein the various individually identifiable streamlets are associated and juxtaposed to form a desired cross-sectional pattern. Once such a juxtaposition of constituent streamlet has been established, a controlled mixing of individual product constituents within the pattern is accomplished in order to create a marbled product stream. In a preferred embodiment of the invention the controlled mixing is accomplished by introducing a portion of the product from one or more of the various individually identifiable constituent streamlets within the pattern into one or more adjacent streamlets of the pattern to form the desired marbled product stream. The marbled product stream is then delivered to a dispensing means which in turn delivers the marbled product stream into a container. A flow interruption means within the dispensing means provides for momentary interruption of the marbled product stream while an additional container is being moved into position beneath the dispensing means. Momentary interruption of the product flow can be accomplished even though the individual product streams are continuously produced since, in accordance with the invention, the period of time during which interruption is required is shortened due to the absence of a requirement that the container into which the product will be deposited be elevated to bring the container bottom in the position adjacent a dispensing nozzle.

In accordance with the invention the container to be filled can be of a variety of sizes and can have a cross-sectional area of from equal to, up to many times larger than, the cross-sectional area of the dispensing means outlet. When the cross-sectional area of the container to be filled is substantially greater than the cross-sectional area of the dispensing means outlet, filling of a container in accordance with the invention can be accomplished without disturbing the overall marbled configuration of the product except by spreading the marbled configuration of the marbled product stream to fill the greater area of the container. By coordinating the amount of mixing of the constituent streamlets to form the marbled product stream and the amount of marbled product stream spreading which will be encountered upon dispensing of the marbled product stream into a container, the overall appearance and configuration of the individually identifiable product constituents within the finished product can be advantageously controlled.

Other objects and advantages of the invention will be apparent from the accompanying specification and claims and from the drawing in which:

Figure 1:
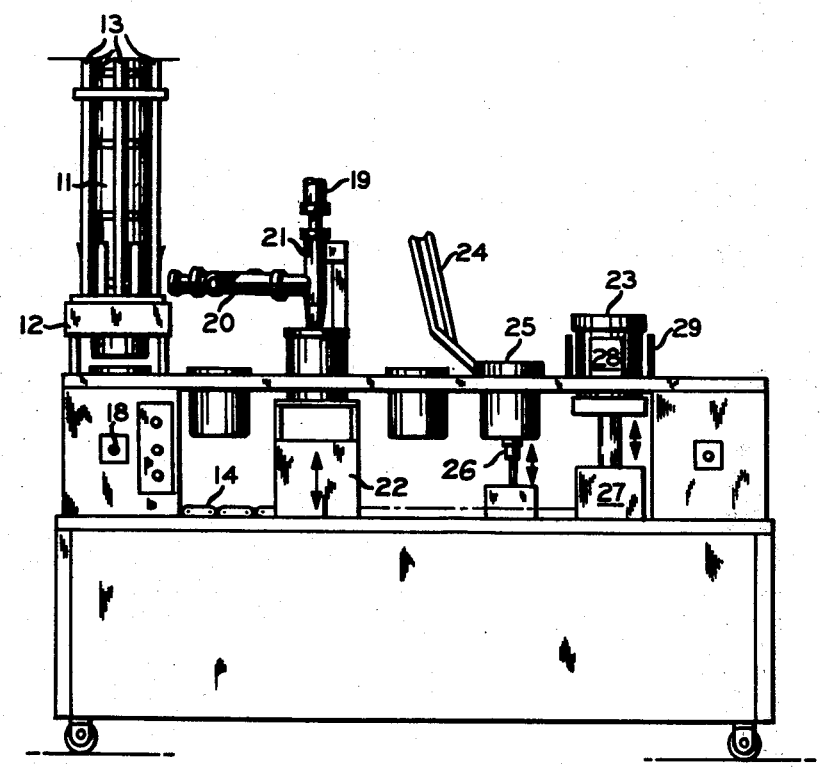
FIG. 1 is a front elevational view of a packaging system which is compatible with the method and apparatus of the invention.

Referring now to FIG. 1, a nested stack of containers 11 is supported by a container dispensing mechanism 12 and six vertical guide rods 13 over the upper run of an endless conveyor 14. The conveyor 14 is indexed in a stepwise manner by a drive axle 18. During the dwell portion of each step or cycle, the dispensing mechanism 12 separates the lowermost container 11 from the stack and drops the separated container into a container support which is positioned on the conveyor 14 below the dispensing mechanism 12. A patterning and marbling means 20 combines a plurality of ingredients and carries them to a dispensing mechanism 21. The dispensing mechanism 21 is actuated during the dwell portion of each cycle by an actuating means 19 to introduce the material to be packaged into the container 11 positioned in the filling station of the conveyor. If desired, a container lift mechanism 22 can be employed to raise the container 11 to be filled so that the outlet end of the dispensing means 21 is at a desired location relative to and coaxial with the container opening before the dispensing mechanism 21 is actuated. When the preferred patterning means 20 and dispensing means 21 are utilized, the lift mechanism 22 can be actuated to bring the top of the container 11 to approximately the same level as the outlet of the dispensing mechanism 21 for filling. Selection of an appropriate height for the dispensing mechanism 21 can therefore result in very little time being utilized by the lift mechanism 22 to raise a container 11 to the desired height following each indexing step of the conveyor 14. The lift mechanism 22 can also be used to compensate for changes in container height with a minimum of machine adjustment when containers having a different upper rim thickness are to be filled.

Closures 23 are fed into a chute 24, the lower end of which is positioned over the conveyor 14, in such a manner that the leading edge of the lowermost closure within the chute 24 is contacted by the leading edge of the rim of the container 11 as the conveyor 14 indexes the filled container into the capping station. The forward motion of the container 11 draws the engaged closure 23 from the chute 24, while the contact of the upper surface of the closure 23 with a horizontal plate 25 forces the closure 23 down onto the rim of the container 11. If desired, a container marking mechanism 26 can be actuated during the dwell portion of each cycle to raise the container 11 and the associated closure 23 into firm contact with the plate 25 to firmly seal the closure 23 onto the container 11 and to apply indicia to the bottom of the container. During the dwell portion of each cycle, a lift mechanism 27 is actuated to raise the filled and capped container which is in the transfer station of the conveyor 14 to a position above the conveyor. A transfer mechanism 28 is then actuated to move the elevated container laterally of the conveyor 14 and into an output chute 29.

Figure 2:
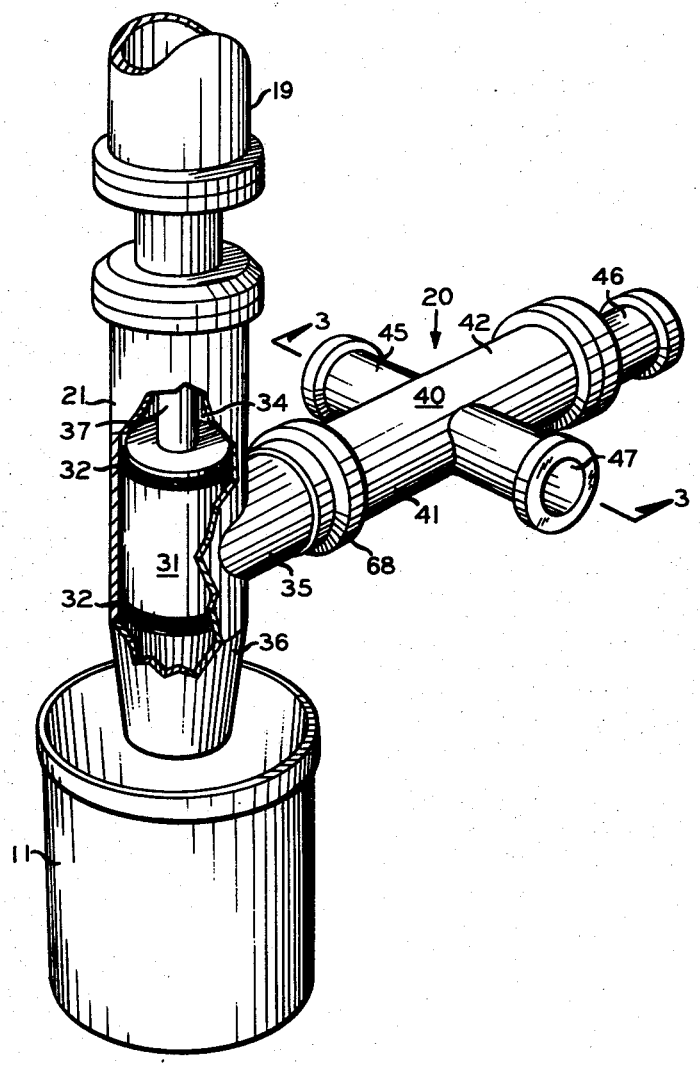
FIG. 2 is a partially cutaway pictorial view of the product forming and dispensing means of the invention.

In FIG. 2 the body of the dispensing means 21 has been partially cut away to show a movable piston 31 mated to and positioned within the cylindrical inner surface of the dispensing means 21. Flow of product within the dispensing means 21 past the piston 31 is precluded by both fitting the piston 31 to match the inner contour of the dispensing means 21 and by providing additional sealing means such as the illustrated "O" rings 32 at each end of the piston 31.

The dispensing means 21 has a main body portion 34 within which the piston 31 is located, an inlet conduit 35 though which material to be dispensed is carried to the main body 34, and a tapered outlet portion 36 through which the material to be dispensed is directed into a container 11. The tapered outlet portion 36 of the dispensing means 21 is preferably an extension of the main body portion 34 thereof. The central axis of the inlet conduit 35 is angularly disposed with respect to the central axis of the main body portion 34 of the dispensing means 21 so that the action of the piston 31 can be used to momentarily seal off the opening of the inlet conduit 35 into the main body portion 34 of the dispensing means 21. Although any angle which will accomplish this purpose can be utilized, in the preferred embodiment illustrated the central longitudinal axis of the inlet conduit 35 is at an angle of about 90 degrees to the central longitudinal axis of the main body 34 and outlet portion 36 of the dispensing means 21.

A piston rod 37 is powered by the actuating means 19. The actuating means 19 can be any double acting cylinder operated by electric, pneumatic, hydraulic, or other similar means to drive the piston rod 37 and piston 31 in either direction within the main body 34 of the dispensing means 21. In FIG. 2 the piston 31 is shown in its lowermost position. In this position product communication between the inlet conduit 35 and the outlet portion 36 of the dispensing means 21 is effectively stopped while an additional container 11 is positioned beneath the dispensing means 21. After momentarily interrupting the flow of product through the dispensing means 21 for a period of time sufficient to permit the positioning of the next container 11, the piston 31 is raised by the piston rod 37 to an elevated position so that free product communication from the inlet conduit 35 to the outlet portion 36 of the dispensing means 21 is again established. Although the position of the container 11 beneath the dispensing means 21 can be varied to achieve desired product effects, it is preferred that the container 11 be located in a coaxial relationship with the main body 34 and outlet portion 36 of the dispensing means 21 so that the product is directed as nearly as possible into the center of the container 11.

The patterning and marbling means 20 comprises a main body member 40 which has a downstream outlet portion 41 and an upstream inlet portion 42. The downstream outlet portion 41 of the patterning and marbling means communicates with the inlet conduit 35 of the dispensing means 21 to provide a flow of marbled product to the dispensing means 21. Although the downstream portion 41 can be of any suitable length, it preferably has a length from the downstream side of the product inlet nearest the downstream end of the patterning and marbling means 20 to the downstream end of the patterning and marbling means at least equal to, and preferably in excess of, its diameter. A plurality of product inlet conduits 45, 46, 47 communicate with the upstream portion 42 of the patterning means 20 in order to provide a flow of various distinctive and individually identifiable constituent materials to the patterning and marbling means 20. Although the preferred embodiment illustrated has three constituent inlet conduits, the method and apparatus of the invention are adaptable to utilize any suitable number of two or more such inlet conduits each supplying a product constituent of generally like consistency and temperature, for example, different flavors of ice cream. Within the upstream portion of the patterning and marbling means 20 the plurality of product streams are oriented to form a desired pattern prior to being marbled and released into the inlet conduit 35 of the dispensing means 21. The marbling action takes place in the downstream portion of the patterning and marbling means 20. Any suitable pattern configuration and product orienting means can be used in conjunction with the patterning and marbling means 20.

FIGS. 3–7 illustrate a preferred product orienting means and the product which is produced when it is utilized in conjunction with the illustrated patterning and marbling means 20 and dispensing means 21. Using the apparatus illustrated there is no requirement that the patterning and marbling means also act as an accumulator for the product while an additional container is brought into position to be filled. The cross-sectional area of the patterning and marbling means 20 can therefore be equal to or less than the total cross-sectional areas of the various constituent conduits 45, 46, 47 which supply product constituents to it. Use of the illustrated apparatus also permits the patterning and marbling means 20 to have a cross-sectional area substantially less than the cross-sectional area of the container 11.

Figure 3:
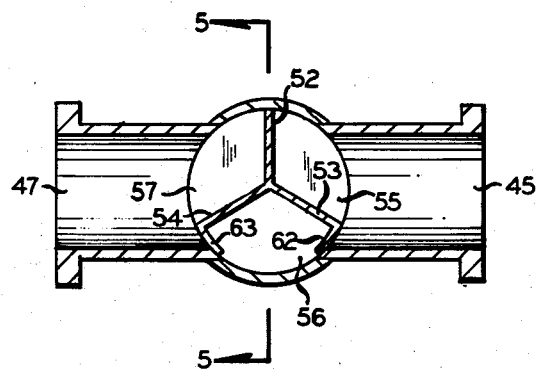
FIG. 3 is a sectional view along section 3—3 of FIG. 2.

FIG. 3 illustrates an upstream cross section of the patterning and marbling means 20 incorporating a preferred apparatus and method for producing a patterned array of constituent streamlets wherein each of three product constituents comprises a wedge-shaped portion of the pattern. A pattern insert 51 having three product dividers 52, 53, 54 extending substantially the entire length of the main body 40 of the patterning and marbling means 20 divides the main body 40 into a plurality of conduits 55, 56, 57. These conduits 55, 56, 57 are each supplied with a distinctive constituent streamlet by respective constituent conduits 45, 46, 47. Although initial communication among the various constituent streamlets entering the patterning and marbling means 20 can be prevented by any suitable means, a preferred means which is adaptable for use with a variety of inserts has blocking plates 61, 62, 63 which prevent communication of each constituent conduit with more than one pattern conduit. Selection of constituent conduits 45, 46, 47 with suitably adapted sizes, shapes, and/or orientations could obviously be utilized in lieu of the blocking plates 61, 62, 63 at the expense of some degree of versatility in the types of patterning and marbling means 20. When a plurality of distinctive constituents are provided to the constituent conduits 45, 46, 47 of a patterning and marbling means 20 equipped with the illustrated insert 51, each product fills its respective pattern conduit 55, 56, 57 and flows toward the viewer of FIG. 3 toward the downstream portion 41 of the patterning and marbling means 20, thereby establishing a patterned constituent flow in which the individual distinctive product constituents assume the relationship one to another dictated by the shape of the insert 51. The purpose of the upstream portion of the patterning and marbling means 20 is to establish the desired pattern using apparatus such as that illustrated. The product patterning means are adapted for accepting a constituent streamlet from each of said supply conduit means and for providing a pattern of juxtaposed adjacent product streamlets having a generally uniform cross-sectional pattern. This upstream portion of the apparatus contributes to the effectiveness of the marbling of the product by providing a relatively stabilized pattern of individually identifiable constituent streamlets which can later be controllably interspersed to form a marbled stream. Although the sectors of the cross section of the main body 40 of the patterning and marbling means 20 defined by pattern conduits 55, 56, 57 can be of any suitable relative size, a preferred embodiment is one in which each pattern conduit has a substantially equal cross-sectional area with a substantially equal angle, about 120° in the embodiment illustrated, between adjacent product dividers 52, 53, 54.

Figure 4:
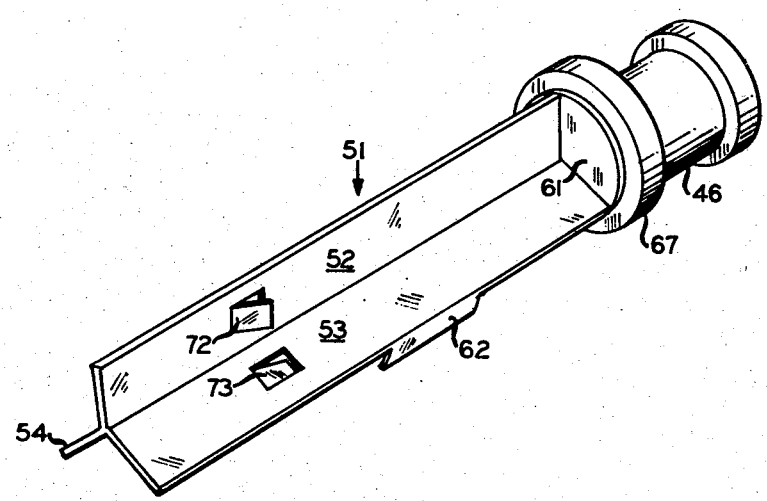
FIG. 4 is a pictorial view of a preferred marbling insert illustrated in cross section in FIG. 3.

In FIG. 4 the product insert 51 is illustrated removed from the main body 40 of the patterning and marbling means 20. Although the insert 51 can be separate from the constituent conduit 46, the constituent conduit 46 is preferably attached to the blocking plate 61 of the insert 51, thereby insuring a seal which prevents flow of material from the constituent conduit 46 into the area between dividers 52 and 53 or the area between dividers 52 and 54 while permitting flow into the area between dividers 53 and 54. The insert 51 is also provided with a flange 67 which is adapted to mate with the upstream end of the upstream portion 42 of the patterning means 20. The flange 67 and upstream end of the main body 40 of the patterning means 20 can be adapted to preclude rotation of the insert 51 within the patterning means 20 by any suitable means.

The downstream portion of the product insert 51 has, on at least one of the respective dividers 52, 53, 54, at least one opening defined by the material of the respective divider and extending through the divider to provide product communication between the adjacent pattern conduits separated by the divider. Although the three openings illustrated in the preferred embodiment of the drawing are of approximately the same size, are located approximately the same distance from the downstream end of the insert 51, and are located approximately the same distance from the edge of each respective divider, any suitable arrangement in the location of such openings including the use of openings in less than all of the dividers, use of more than one opening in one or more of the dividers, varying the distance of one or more of the openings from the downstream edge of the insert 51, varying the distance of one or more of the openings from the edge of its respective divider, variation of the shape or size of one or more of the openings, and other similar modifications can be made in order to achieve a desired effect. In addition, the use of suitable inserts having a different configuration will permit additional variation of the openings provided through the dividers thereof.

A diverter blade 72, 73, 74 associated with each opening through respective dividers 52, 53, 54 is utilized in conjunction with the flow of product material past each opening to provide impetus for a desired amount of each individually identifiable constituent streamlet to flow through each opening into the adjacent constituent streamlet. Each diverter blade 72, 73, 74 is attached to the divider 52, 53, 54 with which it is associated at a suitable location near or adjacent the downstream extremity of the opening through the respective divider, such suitable location being sufficient to produce an increase in pressure upstream of the diverter blade adjacent the opening in the divider to cause the desired amount of product constituent to flow through the opening into the adjacent stream. The preferred diverter blades 72, 73, 74 illustrated comprise the material from their respective dividers 52, 53, 54 which was stamped or otherwise suitably severed on three sides and then bent along the fourth side to form a rectangular opening in each respective divider. The diverting blades can, however, be attached by any means suitable to provide the desired controlled mixing of individual product streams, can be shaped differently from the shape of the openings with which they are associated, and can be of a variety of suitable shapes and relative sizes. In addition to the size and location of the diverter blades, other characteristics of the blades themselves or of their installation or attachment on their associated stream dividers such as, for example, the angled inclination between the divider and the diverter blade, can be used to determine the overall nature and effect of the marbling action accomplished.

Using the preferred insert 51 illustrated the area of each rectangular opening in its associated divider is preferably from about one-fifth to about one-fourth of the cross-sectional area from the adjacent 120° sector which carries an individually identifiable product constituent. Using diverter blades of the illustrated preferred type having approximately the same cross-sectional area as the openings with which they are associated and attached to the downstream edge of the opening, an angle of inclination between the plane of the diverter blade and the plane of the divider of from about 30° to about 45° is presently preferred.

Figure 5:
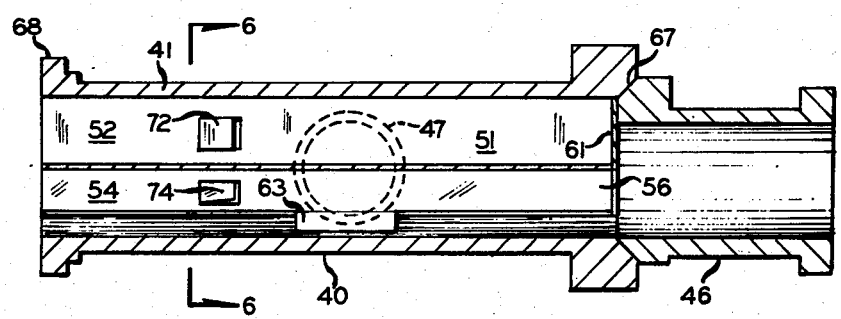
FIG. 5 is a sectional view along section 5—5 of FIG. 3.

In FIG. 5 the relationship of the insert 51 with the patterning and marbling means 20 is further illustrated. Communication between the interior of the constituent conduit 46 and the pattern conduit 56 is permitted while the blocking plate 61 prevents communication with other pattern conduits. Likewise, communication between the interior of the constituent conduit 47 and its associated pattern conduit 57, located behind partitions 52 and 54 of the insert 51, is permitted while the blocking plate 63 precludes communication of the constituent conduit 47 with other pattern conduits. In a similar manner, partitions 52 and 53 along with blocking plate 62 permit communication of constituent conduit 45 with only pattern conduit 55. The dividers 52, 53, 54 defining pattern conduits, 55, 56, 57 terminate at the downstream end of the downstream portion 41 of the patterning and marbling means 20. The downstream end 41 of the patterning and marbling means 20 can be fitted with any suitable attachment means 68 adapted to mate with and to be engaged to the inlet conduit 35 of the dispensing means 21.

The relative location of the openings within the dividers 52, 53, 54 with the product conduit 45 and the oppositely positioned product conduit 47 is illustrated by FIG. 5. The openings within the dividers are preferably located a sufficient distance downstream of the constituent conduits 45 and 47 so that establishment of a desired pattern can be accomplished and stabilized by the time the product flow reaches the openings. The openings are therefore preferably located downstream a distance at least about equal to the inside diameter of the patterning and marbling means 20 from the most downstream point of confluence of the generally straight central portion of the patterning and marbling means 20 with any product constituent supply conduit.

In addition to using a patterned stream having dividers such as the dividers 52, 53, 54 illustrated to establish a desired pattern from which a controlled amount of mixing can be used to create a marbled effect, continuance of the dividers 52, 53, 54 downstream of the openings therein is helpful in reducing unwanted turbulence within the marbled stream downstream of the openings. Such unwanted turbulence can cause excessive mixing of portions of the product which interferes with the desirable sharpness of interface between the individually identifiable product constituents and therefore deleteriously affects the quality of the finished product. Although termination of the downstream extensions of the dividers 52, 53, 54 can, in appropriate circumstances, be utilized to achieve some desired degree of turbulence, it is preferred that the dividers extend downstream from the openings therein a distance at least about equal to the inside diameter of the patterning and marbling means 20.

Figure 6:
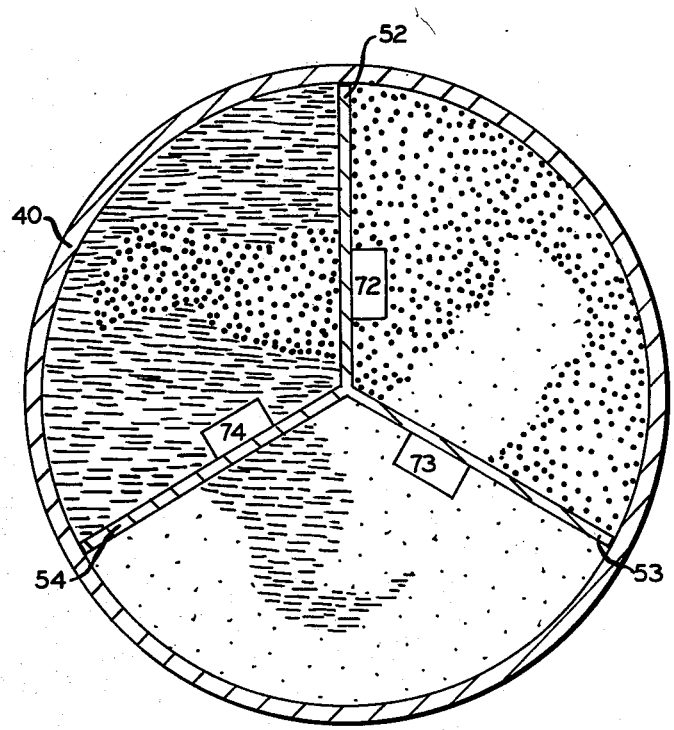
FIG. 6 is a cross-sectional view along section 6—6 of FIG. 5 including a schematic representation of the controlled mixing of the invention.

FIG. 6 schematically illustrates the action of the diverter blades 72, 73, 74 in providing controlled mixing of the individually identifiable product constituents within the main body 40 of the patterning and marbling means 20. As each of the product constituents flowing through its respective pattern conduit defined by dividers 52, 53, 54 reaches the opening in the divider and the associated diverter blades 72, 73, 74, a portion of the individually identifiable constituent material contained therein is forced through the opening and into the adjacent pattern conduit. The turbulence associated with the flow from one pattern conduit to the adjacent conduit will result in some degree of swirling action to create a generally marbled appearance. The amount of swirling action which is thus induced can be controlled by the size of the openings in the dividers, the size, shape, angle of inclination, and other similar features of the diverting blades 72, 73, 74, and other conditions such as the rate of flow of material through the pattern conduits. As previously mentioned, while some additional mixing or swirling may continue as the now partially combined constituent streamlets continue to flow through the patterning and marbling means, this additional mixing can be minimized by extending the dividers 52, 53, 54 downstream from the openings therein as illustrated by FIG. 5.

Although any suitable patterning and marbling means 20 can be utilized to produce a patterned array of constituent streamlets which can be marbled and subsequently accepted and dispensed by the dispensing means 21, the embodiment illustrated by the drawing is preferred for its ease of construction and ability to accept any suitable pattern insert. In accordance with the invention, a plurality of distinctive or differently colored but similar product constituents, each having a similar density, viscosity, and temperature, are supplied to the plurality of constituent conduits of the patterning means by any suitable means such as one or more ice cream freezing machines or other constituent supply means. The plurality of constituent streamlets is thence formed into a suitable pattern having a cross-sectional pattern or configuration determined by the pattern insert or other internal construction of the patterning means. After the pattern has been established and stabilized, a controlled mixing of adjacent individually identifiable product constituents is accomplished by diverting a portion of the product within one or more constituent streamlets into an adjacent streamlet. The marbled product stream from the outlet of the patterning and marbling means is accepted by the inlet conduit of the dispensing means which is preferably of the same cross-sectional shape and area as the patterning and marbling means outlet.

Within the dispensing means the marbled product stream is conveyed from the inlet conduit to a main body portion, preferably having substantially the same cross sectional shape and area as the inlet conduit, which in turn provides for flow of the marbled product stream to an outlet portion thereof. Although the outlet portion of the dispensing means can be untapered, use of a gently tapered outlet portion wherein the outlet walls taper inwardly at an angle of about 15°, for example, to decrease the outlet opening of the dispensing means to about three-fourths the diameter of the main body is preferred for the purpose of increasing the flow rate of product from the dispensing means without disrupting the distinctive product marbling pattern. In a preferred embodiment, the passageway through the dispensing means has a cross-sectional area no greater than the cross-sectional area of the patterning and marbling means.

The flow of product from the dispensing means is periodically interrupted by the downward movement of the piston within the main body of the dispensing means to prevent communication between the inlet conduit and main body of the dispensing means. The speed with which the piston is lowered is preferably substantially greater than the speed at which product is flowing through the dispensing means so that the final amount of product placed into a container is deposited with a burst of downward velocity which tends to level the product within the container or, if desired, to leave a small mound of material within the middle of the container to provide a desirably firm contact between the top surface of the packaged product and, for example, a transparent window within the container cover.

In any specific application, additional advantages of the method and apparatus of the invention can be realized by coordinating the effects of the patterning and marbling means 20 with those of the container filling portion of the specific apparatus being used. In particular, the specific configuration of the patterning and marbling means 20, the speed with which product material is passed through the patterning and marbling means 20 to the filling apparatus, and the degree of spreading of the marbled product stream to fill the container each have an effect on the type of distinctive marbled configuration of the final packaged product.

A particular advantage of the disclosed method and apparatus is the ability to produce a product having a uniform distinctive marbled configuration as determined by the patterning and marbling means. Filling of a container having either straight or tapered sidewalls can be best accomplished by injecting the product from the dispensing means directly into the center of the container at a high rate of speed. As the product expands outwardly upon reaching the bottom of the container or upon reaching the product level within the container, such expansion is uniform across the cross section of the product stream, thereby maintaining the distinctive marbling pattern established by the patterning and marbling means.

The method and apparatus of the invention are useful in packaging any material having sufficient viscosity to be placed within a container with a similar material without substantial mixing of the two materials, yet being sufficiently plastic to be shaped to a desired marbled configuration. Such materials include, but are not limited to, ice cream, yogurt, cottage cheese, puddings, peanut butter, pastry dough, partially frozen or solidified liquids, pseudo-plastic materials, thixotropic fluids, solid particulate materials, finely divided solid materials, and the like. The invention is particularly useful in the packaging of semi-frozen products prepared by freezing, while stirring, a mixture comprising a dairy product and flavoring additives. Such products include, but are not limited to, ice cream, ice milk, sherbet, and the like. Such materials will be preferably slightly compressible due to either the nature of the material itself or to the incorporation within the material of an amount of compressible material, such as air in the case of many semi-frozen products.

Figure 7:
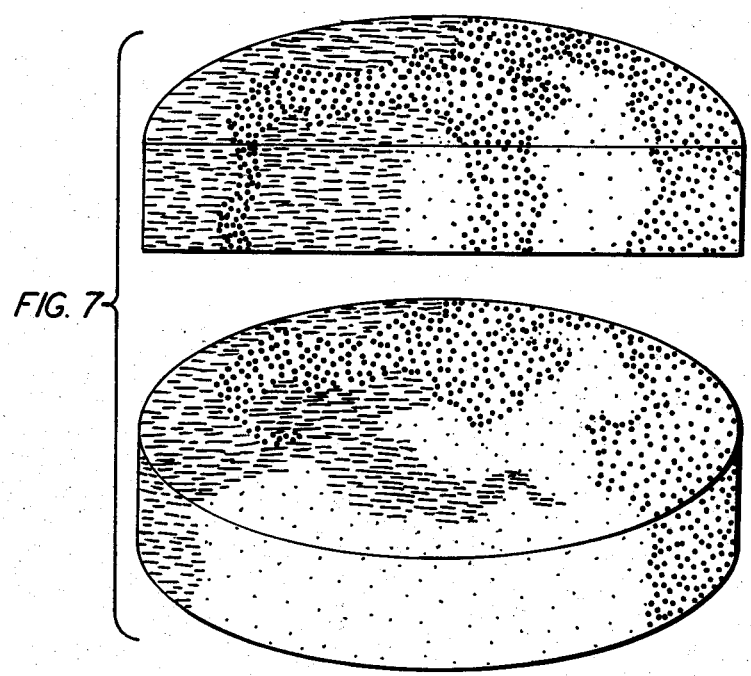
FIG. 7 is an exploded view of cut sections of a marblized type of product which can be produced utilizing the method and apparatus of the invention.

FIG. 7 is a schematic illustration of the type of marbled product which can be produced using the method and apparatus of the invention. For purposes of schematic illustration the product has been sectioned both horizontally and vertically. The product is characterized by a marbled configuration which is distinctive in that the configuration of product in different containers is surprisingly uniform. This uniformity is sufficient to permit product recognition independent of the producer's label or other identifying packaging indicia. Although the apparatus of the invention is one which, except for its marbling or controlled mixing features, would produce a generally patterned product, the marbled product produced is not characterized by a uniform cross-sectional configuration from the top of the container to the bottom thereof. This is believed to be due to the dynamic characteristics of the mixing of adjacent individually identifiable constituent streamlets. Even though the mixing of adjacent individually identifiable product constituents is controlled within a limited portion of the overall product conduit area, that mixing which does occur is essentially random as it relates to the specific pattern which one distinctive product constituent makes as it is injected into a streamlet of another distinctive product constituent. The finished product therefore retains both the random characteristics associated with a marbled product and the desirable uniformity characteristics which assure customer recognition of the product, dependability of overall product content, and other similar factors which contribute to the commercial success of a product.

While the specific embodiments of the invention described herein are particularly useful, many modifications to the method and apparatus of the invention can be made without departing from the spirit and scope thereof. For example, a substantial number of patterning insert configurations could be utilized along with variation in the configuration of the upstream inlet portion 42 of the patterning and marbling means 20 to produce a nearly unlimited number of distinctive marbled configurations for use with nearly any combination of two or more distinctive products. Likewise, the cross-sectional shape of the downstream outlet portion 41 of the patterning and marbling means 20 and of the inlet conduit 35, main body 34, and outlet portion 36 of the dispensing means 21 can be altered to facilitate filling of containers having various cross-sectional shapes or modification of the marbling established by the patterning and marbling means 20 as desired. Other reasonable variations and modifications by those skilled in the art are possible within the scope of the foregoing description of the invention and the appended claims thereto.

What is claimed is:
1. Apparatus comprising:
    a plurality of supply conduit means adapted to supply a plurality of product constituent streams of similar viscosity and temperature;
    product patterning means having a plurality of inlet means and an outlet end, each said inlet means being operably connected to a respective one of said plurality of supply conduit means, said product patterning means being adapted for accepting a constituent streamlet of product from each of said supply conduit means and for providing a pattern of juxtaposed adjacent product streamlets;
    product marbling means between said inlet means and said outlet end for mixing a limited portion of at least one product constituent within said pattern of product streamlets with an adjacent product streamlet within said pattern of product streamlets to produce a marbled product stream and deliver said marbled product stream from said outlet end; and a dispensing valve means for accepting said marbled product stream and delivering separated segments of said marbled product stream from a delivery outlet thereof.

2. Apparatus in accordance with claim 1 wherein said dispensing means comprises a tubular dispensing valve chamber having a flow interruption means associated therewith for separating said marbled product stream into said separated segments.

3. Apparatus in accordance with claim 2 wherein said tubular dispensing chamber and a dispensing valve means inlet associated with said dispensing valve means are of substantially the same cross-sectional size and shape as the outlet of said product patterning means.

4. Apparatus in accordance with claim 2 wherein said tubular dispensing chamber receives said patterned product stream through an opening in the side of said dispensing chamber and wherein said flow interruption means comprises a piston mated with the walls of said tubular dispensing chamber, said piston being movable within said dispensing chamber to selectively cover said opening.

5. Apparatus in accordance with claim 4 wherein said tubular dispensing chamber and a dispensing valve means inlet associated with said dispensing valve means are of substantially the same cross-sectional size and shape as the outlet of said product patterning means.

6. Apparatus in accordance with claim 2 wherein said product patterning means comprises a tubular patterning chamber subdivided into a plurality of tubular pattern conduits, by divider means each said pattern conduit being operably connected to one of said plurality of supply conduit means, and wherein said product marbling means comprises at least one means through said divider means for providing communication between adjacent pattern conduits at a location downstream of the confluence of said pattern conduits with said plurality of supply conduit means.

7. Apparatus in accordance with claim 6 wherein each said pattern conduit has a longitudinal central axis which is generally parallel to the longitudinal central axis of said patterning chamber.

8. Apparatus in accordance with claim 7 wherein each said means for providing communication between adjacent pattern conduits comprises means defining an opening and a respective diverter means for directing material from one pattern conduit into an adjacent pattern conduit through the respective opening.

9. Apparatus in accordance with claim 8 wherein said patterning chamber is divided into three said pattern conduits of substantially equal cross sectional area, and wherein said product marbling means comprises at least one said means for communication between each conduit and an adjacent conduit.

10. Apparatus in accordance with claim 9 wherein said product chamber has a generally circular cross section and the cross section of each of said pattern conduits comprises a sector of said generally circular cross section.

11. Apparatus in accordance with claim 6 wherein said marbling means is located downstream from the furthermost downstream confluence of said supply conduit means with said patterning means a distance greater than about the inside diameter of said patterning chamber.

12. Apparatus in accordance with claim 11 wherein said pattern conduits continue downstream from said marbling means a distance greater than about the inside diameter of said patterning chamber.

13. Apparatus in accordance with claim 12 wherein each means for providing communication between adjacent pattern conduits comprises means defining an opening and a respective diverter means for directing material from one pattern conduit into an adjacent pattern conduit through said respective opening.

14. Apparatus in accordance with claim 13 wherein said patterning chamber is divided into three said pattern conduits of substantially equal cross sectional area, and wherein said product marbling means comprises at least one said means for providing communication between each pattern conduit and an adjacent pattern conduit.

15. Apparatus in accordance with claim 1 wherein said product patterning means is adapted to provide a pattern of product streamlets having a generally uniform cross-sectional pattern.

16. Means for shaping a plurality of product constituents into a marbled product stream, said means comprising:

a tubular patterning chamber having a generally circular cross section and being divided into a plurality of pattern conduits by divider means, each said pattern conduit having a separate inlet means for communicating with a product supply conduit, the cross section of each said pattern conduit comprising a sector of the generally circular cross section of said patterning chamber;

first means for diverting a limited portion of material from each said pattern conduit into an adjacent pattern conduit, said first means being located downstream of all of said inlet means.

17. Means for shaping in accordance with claim 16 wherein each said first means comprises second means for providing product communication between adjacent pattern conduits, each said second means includes means defining an opening communicating between adjacent pattern conduits and has associated therewith a diverter blade located adjacent a downstream extremity of a respective said opening between said adjacent pattern conduits.

18. Means for shaping in accordance with claim 17 wherein said second means for providing product communication has an effective passage area of from about one-fifth to about one-fourth the cross-sectional area of the pattern conduit into which it diverts product material.

19. Means for shaping in accordance with claim 18 wherein each said diverter blade comprises a substantially planar blade attached to a wall separating said pattern conduit from an adjacent conduit at the downstream edge of its associated opening and projecting from the plane of said wall at an angle of from about 30° to about 45°.

20. Means for shaping in accordance with claim 19 wherein each said pattern conduit is of substantially equal cross-sectional area.

21. Means for shaping in accordance with claim 20 wherein there are three said pattern conduits.

22. A method for forming a marblized product, said method comprising the steps of:

continuously passing a plurality of product constituent streamlets, each having a similar viscosity, to a patterning zone;

juxtaposing said product streamlets to form a patterned flow of constituent streamlets having a desired cross-sectional pattern within said patterning zone;
delivering said patterned flow of streamlets from said patterning zone to a marbling zone;
mixing a limited portion of at least one constituent streamlet of said pattern with an adjacent streamlet within said pattern to produce a marbled product stream; and
delivering said marbled product stream to a dispensing means.

23. A method in accordance with claim 22 wherein said mixing step comprises diverting a portion of each individually identifiable product constituent within said pattern into an adjacent portion of said cross-sectional pattern.

24. A method in accordance with claim 23 additionally comprising:
periodically interrupting the flow of said marbled product stream through said dispensing means; and
dispensing increments of said marbled product stream from an outlet of said dispensing means to form a marbled product.

25. A method in accordance with claim 24 wherein dispensing increments of said marbled product stream comprises dispensing said marbled product stream into a container having a cross-sectional area substantially greater than the cross-sectional area of the outlet of said dispensing means.

26. A method in accordance with claim 25 additionally comprising momentarily accelerating the rate at which said marbled product stream is dispensed from said dispensing means simultaneously with the step of interrupting the flow of said marbled material from said dispensing means.

* * * * *

UNITED STATES PATENT AND TRADEMARK OFFICE
CERTIFICATE OF CORRECTION

PATENT NO. : 4,136,720
DATED : January 30, 1979
INVENTOR(S) : Alfred W. Kinney

It is certified that error appears in the above—identified patent and that said Letters Patent are hereby corrected as shown below:

Column 11 (claim 2), line 8, after "dispensing", first occurrence, insert --- valve --- and after "dispensing", second occurrence, delete "valve".

Column 11 (claim 6), line 33, after "conduits" delete the comma and after "means" insert a comma.

Signed and Sealed this

Twenty-fifth Day of September 1979

[SEAL]

Attest:

LUTRELLE F. PARKER
Attesting Officer    Acting Commissioner of Patents and Trademarks